UNITED STATES PATENT OFFICE.

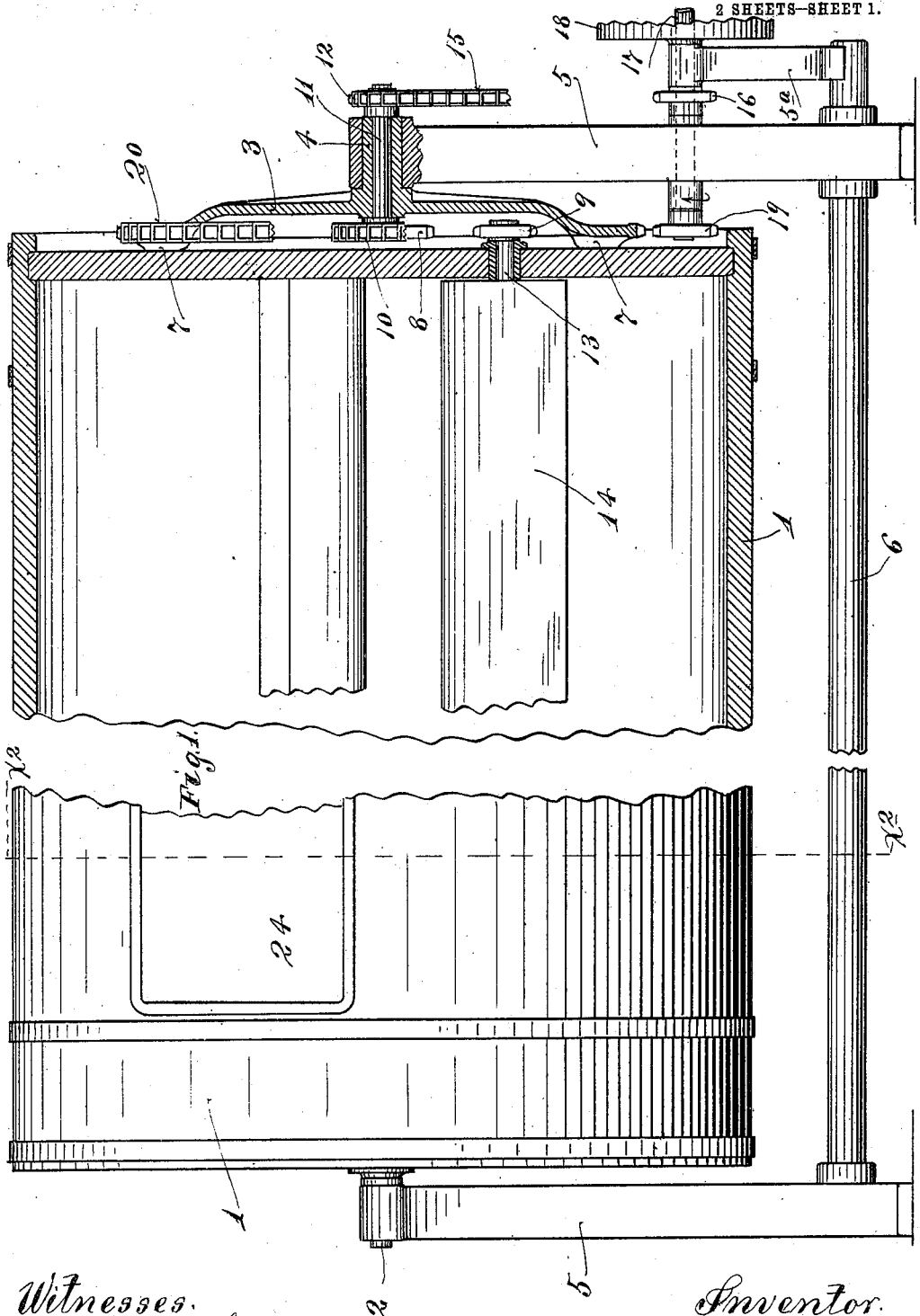

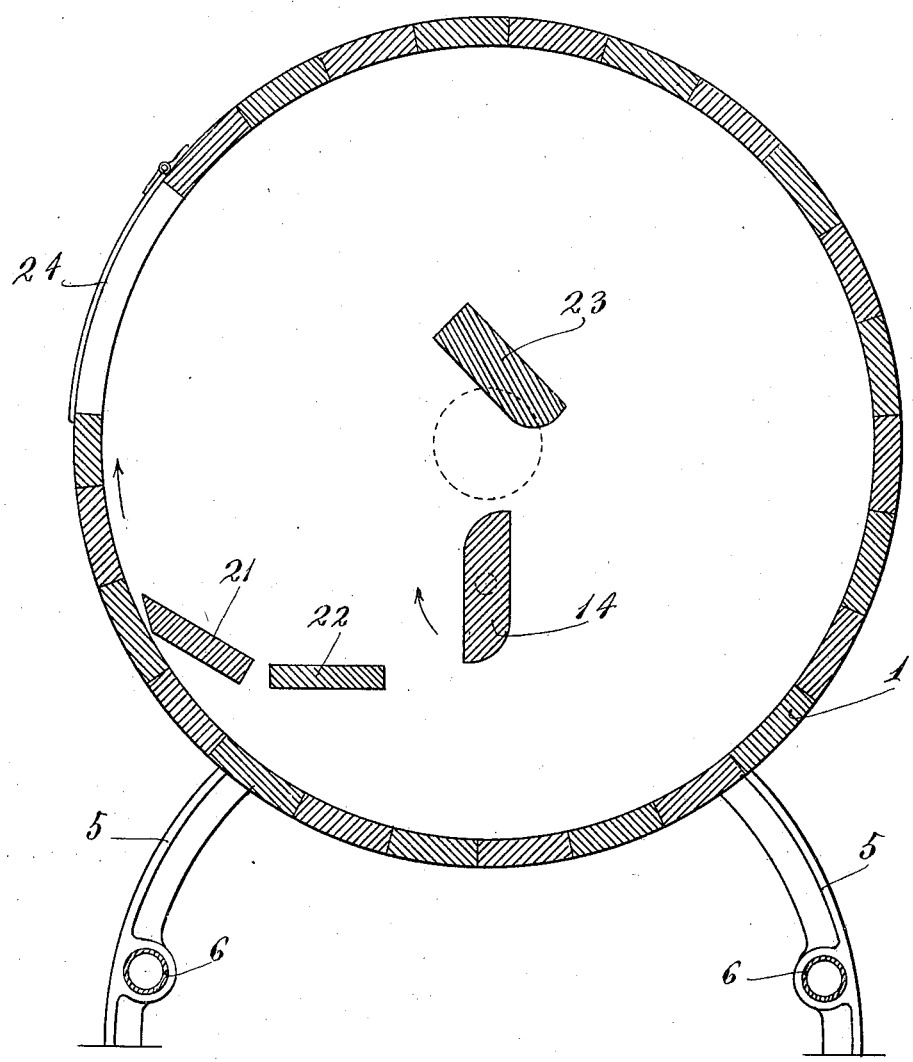

REUBEN B. DISBROW, OF OWATONNA, MINNESOTA.

COMBINED CHURN AND BUTTER-WORKER.

981,394. Specification of Letters Patent. Patented Jan. 10, 1911.

Application filed March 14, 1910. Serial No. 549,362.

*To all whom it may concern:*

Be it known that I, REUBEN B. DISBROW, a citizen of the United States, residing at Owatonna, in the county of Steele and State of Minnesota, have invented certain new and useful Improvements in Combined Churns and Butter-Workers; and I do hereby declare the following to be a full, clear, and exact description of the invention, such as will enable others skilled in the art to which it appertains to make and use the same.

My present invention has for its especial object to provide a combined churn and butter worker of extremely simple construction and very high efficiency, both in the churning and butter-working actions, and to such ends, the invention consists of the novel devices and combinations of devices hereinafter described and defined in the claims.
In the accompanying drawings which illustrate the invention, like characters indicate like parts throughout the several views.

Referring to the drawings, Figure 1 is a view, partly in elevation and partly in vertical section, showing the improved machine, some parts being broken away; and Fig. 2 is a transverse section taken on the line $x^2 \, x^2$ of Fig. 1.
The cylindrical shell or rotary drum 1 of the machine is approximately horizontally disposed, and one of its heads is provided with a directly secured trunnion 2, while the other head thereof has directly secured thereto a large sprocket 3 having a hollow trunnion 4. The trunnions 2 and 4 are journaled in bearings afforded by the upper portions of pedestal brackets 5, which, as shown, are rigidly secured by parallel tie bars 6.
The peripheral portion of the large sprocket 3 has inset portions 7, that are journaled or otherwise rigidly secured to the adjacent drum head, and the body portion of the said sprocket is offset a considerable distance from the said drum head to afford a clearance for sprockets 8 and 9, and a sprocket chain 10 arranged to run over said sprockets. The sprocket 8 is carried by the inner end of a short countershaft 11 journaled in the hollow trunnion 4 and provided, at its outer end, with a small sprocket 12. The sprocket 9 is secured to the outer end of one trunnion 13 of a rotary board or flight 14 that is located eccentric to the axis of the drum but is extended from head to head thereof.

A sprocket chain 15 runs over the sprocket 12 and over a sprocket 16 carried by a driving countershaft 17 mounted in a bearing afforded by a portion of the adjacent end bracket 5 and another bearing afforded by a supplemental bracket 5ª rigidly secured to the projecting ends of tie bars 6. The driving shaft 17 also carries a pulley 18 and a small sprocket 19. A power-driven belt, not shown, is, in practice, run over the pulley 18. A sprocket chain 20 is arranged to run over the said small sprocket 19 and the large sprocket 3.

With the driving connections above described, the drum and the rotary flight or board 14 will be rotated in the same direction, but the latter will be rotated at a much higher rate of speed than the former. The proper direction of the rotation of the drum and flight is indicated by arrows marked in Fig. 2.

The rotary flight or board 14 and coöperating non-rotary flights 21, 22 and 23, that extend from end to end of the drum and are rigidly secured to the heads thereof, make up a sort of cage or basket-like scoop which picks up the butter in the butter-working action. The said flights 21 and 22 are located adjacent to each other and the former is immediately adjacent to the shell of the drum. The flight 23, as well as the other flights, is preferably located eccentric to the axis of the drum, and all of the fixed flights, in cross section, extend tangential to different imaginary circles struck from the axis of the drum. The rotary flight 14 is located in the gap between the edges of the flights 22 and 23, and, when turned into approximate alinement with the adjacent edges of the fixed flights, will coöperate therewith to hold the body of butter in the cage afforded by the said flights. In the churning action, all of the flights serve to agitate the cream and this is especially so in respect to the rotary flight 14. In the butter-working action, the butter is picked up, collected and massed and then raised primarily by the flights 21 and 22, but as the body of butter is lifted to a higher elevation, it rolls onto the rotary flight 14 and against the fixed flight 23, but by the rotating flight, it will be cut into long strips and dropped again back to the bottom of the drum. The butter is not scraped or smeared against the adjacent flights but is simply sheered off and then carried through the opening to the bottom of the drum without destroying the grain or globular formation of the butter.

The drum 1 is provided with the customary peripheral doors 24, which, of course, normally close with liquid tight joints. After the butter has been thoroughly worked, it may be raised out of the brine and held where it may be easily reached through the open doors simply by rotating the drum into a position with the cage-forming flights elevated somewhat higher than shown in Fig. 2.

In actual practice, this improved combined churn and butter worker has been found highly efficient, both as a churn and as a butter worker. It may be also constructed at small cost. It has no parts liable to get out of order.

What I claim is:

1. In a machine of the kind described, an approximately horizontal rotary drum, provided with a multiplicity of flights extended longitudinally thereof and arranged to form a cage, one of the intermediate flights being transversely flattened and mounted to rotate, substantially as described.

2. In a machine of the kind described, an approximately horizontal rotary drum, provided with a multiplicity of flights extending from end to end thereof, one of the intermediate flights being arranged to rotate and the other flights being fixed to the heads of the drum and extended transversely from the shell of the drum on lines that are tangential to different imaginary circles struck from the axis of the drum, substantially as described.

3. In a machine of the kind described, an approximately horizontal rotary drum provided within with a multiplicity of flights extending from end to end thereof, one of the intermediate flights being arranged to rotate, and the fixed flights being extended inward from the shell of the drum on lines that are tangential to different imaginary circles struck from the axis of the drum, and means for rotating said drum and said rotary flight in the same direction, the latter at a higher speed than the former, substantially as described.

4. In a machine of the kind described, the combination with end bearings and an approximately horizontal rotary drum mounted to rotate thereon, of a sprocket secured to but spaced from one of the drum heads, having a hollow trunnion journaled in one of said brackets, a rotary flight or member within said drum having a projecting trunnion provided with a sprocket, a shaft extended through said hollow trunnion and provided with sprockets at its inner and outer ends, a sprocket chain running over the sprocket on said first noted trunnion, a driving shaft provided with two driving sprockets, a sprocket chain running over one of said driving sprockets and over a large sprocket on the drum head and another sprocket chain running over the sprocket on the outer end of said countershaft.

In testimony whereof I affix my signature in presence of two witnesses.

REUBEN B. DISBROW.

Witnesses:
MARIE E. LA PALME,
HARRY D. KILGORE.